(12) United States Patent
Sasao et al.

(10) Patent No.: US 8,787,229 B2
(45) Date of Patent: Jul. 22, 2014

(54) MOBILE TERMINAL AND MOBILE TERMINAL DATA RELAY METHOD

(75) Inventors: Nobuaki Sasao, Tokyo (JP); Jun Hashimoto, Tokyo (JP); Hisashi Takeshita, Tokyo (JP); Kentaro Itagaki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 111 days.

(21) Appl. No.: 13/147,942

(22) PCT Filed: Feb. 8, 2010

(86) PCT No.: PCT/JP2010/051768
§ 371 (c)(1),
(2), (4) Date: Aug. 4, 2011

(87) PCT Pub. No.: WO2010/090306
PCT Pub. Date: Aug. 12, 2010

(65) Prior Publication Data
US 2011/0292864 A1 Dec. 1, 2011

(30) Foreign Application Priority Data
Feb. 6, 2009 (JP) .................................. 2009-026249

(51) Int. Cl.
*G08C 17/00* (2006.01)
(52) U.S. Cl.
USPC ......................... 370/311; 370/315; 455/412.1
(58) Field of Classification Search
None
See application file for complete search history.

(56) References Cited

U.S. PATENT DOCUMENTS

| | | | | |
|---|---|---|---|---|
| 2005/0085279 A1* | 4/2005 | Aoki | ............................. | 455/574 |
| 2007/0260720 A1* | 11/2007 | Morain | ........................ | 709/223 |
| 2008/0298288 A1* | 12/2008 | Sharma | ........................ | 370/311 |
| 2009/0034443 A1* | 2/2009 | Walker et al. | ................. | 370/311 |
| 2009/0040954 A1* | 2/2009 | Usuba | ............................ | 370/311 |
| 2009/0052463 A1* | 2/2009 | Chen et al. | .................... | 370/406 |
| 2010/0135195 A1* | 6/2010 | Sakoda | ........................ | 370/311 |

FOREIGN PATENT DOCUMENTS

| | | |
|---|---|---|
| JP | 2001346259 | 12/2001 |
| JP | 2004297381 | 10/2004 |
| JP | 2004363700 | 12/2004 |
| JP | 2005-513919 A | 5/2005 |
| JP | 2006025262 | 1/2006 |
| JP | 2006332942 | 12/2006 |

OTHER PUBLICATIONS

PCT Search Report, Intl. Application No. PCT/JP2010/051768; Date Mailed May 11, 2010.

(Continued)

*Primary Examiner* — Brian Roberts
(74) *Attorney, Agent, or Firm* — MKG, LLC (57) ABSTRACT

A mobile terminal includes: a first manner of wireless communicator for conducting wireless communication with a client terminal; a second communicator for conducting wireless communication with a network (NW1); storage for storing data; and communication control for causing data to be transmitted between communicators. The communication control causing data received via the second communicator to be stored when a client terminal is in a state in which the client terminal does not receive data, and causes the stored data to be transmitted by the first communicator when the client terminal is in a state in which the client terminal receives data. Further, the communication control causes the data received via the first communicator to be stored when wireless communication with the network is not possible, and causes the stored data to be transmitted by the second communicator when wireless communication with the network is possible.

3 Claims, 4 Drawing Sheets

(56) References Cited

OTHER PUBLICATIONS

Office Action from corresponding Japanese Application No. 2010-549529, dated Mar. 12, 2013.

Chinese Office Action for corresponding Chinese Application 201080006486.X dated Aug. 23, 2013.

Second Notification of Office Action issued in corresponding Chinese Patent Application No. 201080006486.X, dated Feb. 27, 2014.

* cited by examiner

MOBILE TERMINAL AND MOBILE TERMINAL DATA RELAY METHOD

TECHNICAL FIELD

The present invention relates to technology for using a mobile terminal as a relay device in a network.

BACKGROUND

A mobile terminal that can connect to multiple communication networks is currently in use. For example, it is possible, by use of a technique disclosed in Japanese Patent No. 4133596, to cause a client terminal that is connected to a mobile terminal via a wireless LAN (Local Area Network) to connect to another communication network that is different from the wireless LAN via the mobile terminal.

SUMMARY

In a case where data is relayed by a mobile terminal, it is desirable to take into account characteristic features of the mobile terminal. Thus, an object of the present invention is to relay data in a manner suitable for a mobile terminal.

A mobile terminal according to one aspect of the present invention includes: a first communication means for conducting wireless communication with a client terminal; a second communication means for conducting wireless communication with a network; a storage means for storing data; and a communication control means for causing data received via one of the first communication means and the second communication means to be transmitted by the other, wherein the communication control means causes the data received via the second communication means to be stored in the storage means when the client terminal is in a state in which the client terminal does not receive data, and causes the stored data to be transmitted by the first communication means when the client terminal is in a state in which the client terminal receives data, and the communication control means causes the data received via the first communication means to be stored in the storage means when wireless communication with the network is not possible, and causes the stored data to be transmitted by the second communication means when wireless communication with the network is possible.

The mobile terminal according to the present invention may include a beacon transmission means for transmitting beacons at a transmission interval determined based on information received from the client terminal.

In such a case, the beacon transmission means may set the transmission interval of the beacon to be longer after the client terminal has associated with the mobile terminal than prior to the association or may set the transmission interval of the beacon to be shorter during data communication between the mobile terminal and the client terminal than while the mobile terminal is waiting for data from the client terminal.

A data relay method according to another aspect of the present invention may be a data relay method for relaying, at a mobile terminal, data transmitted between a client terminal and a network, including: a first step for storing data received by the mobile terminal via the network in a storage means of the mobile terminal when the client terminal is in a state in which the client terminal does not receive data; a second step for transmitting the data stored in the first step from the mobile terminal to the client terminal when the client terminal is in a state in which the client terminal receives data; a third step for storing data received by the mobile terminal from the client terminal in the storage means when wireless communication between the network and the mobile terminal is not possible; and a fourth step for transmitting the data stored in the third step from the mobile terminal to the network when wireless communication between the network and the mobile terminal is possible.

In the present invention, it is possible to relay data in a manner suitable for a mobile terminal.

DETAILED DESCRIPTION

Figure 1:
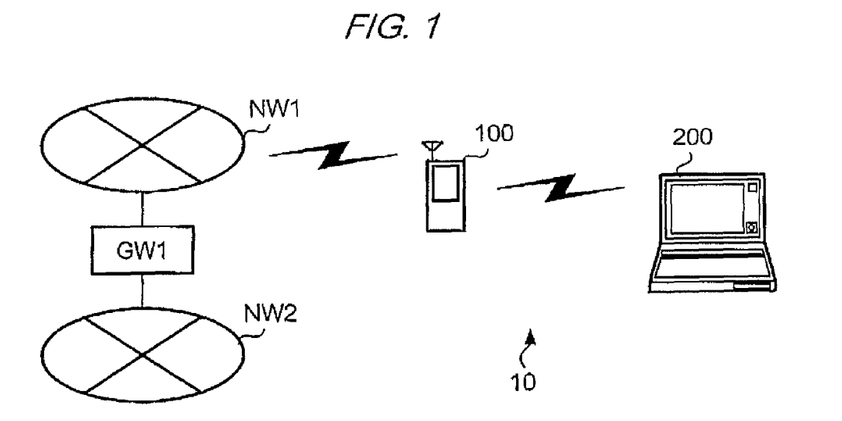
FIG. 1 is a diagram showing an overall configuration of a wireless communication system according to an exemplary embodiment of the present invention.

FIG. 1 is a diagram showing an overall configuration of a wireless communication system according to an exemplary embodiment of the present invention. Wireless communication system 10 in this exemplary embodiment includes mobile terminal 100 and client terminal 200, where mobile terminal 100 relays data transmitted between client terminal 200 and network NW1. Mobile terminal 100 is a mobile telephone, for example, and in such a case, network NW1 is a mobile communication network. Client terminal 200 is a personal computer, for example. It is to be noted that network NW1 is connected to network NW2 via gateway device GW1. Network NW2 is the Internet, for example.

In this embodiment, it is assumed that a single user owns mobile terminal 100 and client terminal 200, and operates client terminal 200 to connect to network NW2. It is also assumed that client terminal 200 does not include means for connecting with network NW2, and connects with network NW2 via mobile terminal 100. Client terminal 200 can communicate with mobile terminal 100 via wireless LAN, and mobile terminal 100 can communicate with one of the nodes (base stations) constituting network NW1. Namely, in this embodiment, mobile terminal 100 serves as an access point when client terminal 200 connects with network NW2.

Figure 2:
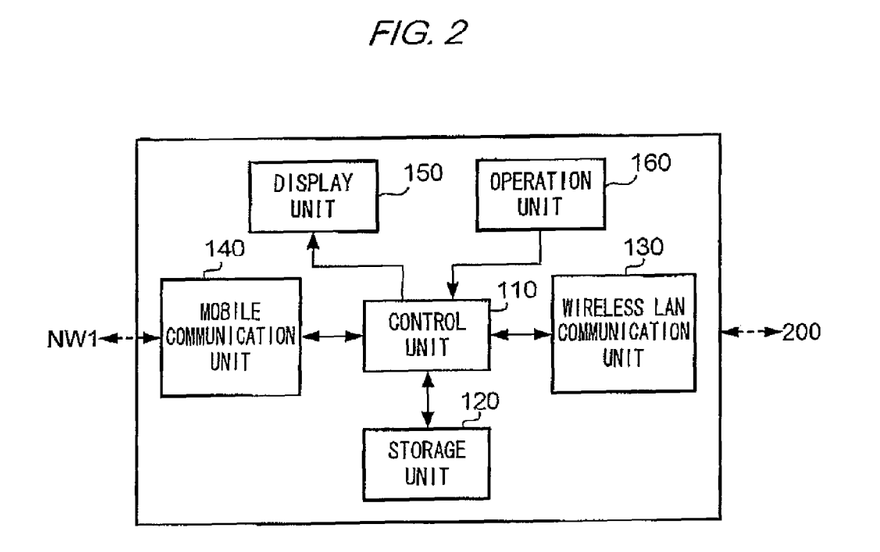
FIG. 2 is a block diagram showing a configuration of a mobile terminal.

FIG. 2 is a block diagram showing a configuration of mobile terminal 100. As shown in this drawing, mobile terminal 100 includes control unit 110, storage unit 120, wireless LAN communication unit 130, mobile communication unit 140, display unit 150, and operation unit 160.

Control unit 110 includes a CPU (Central Processing Unit) and a memory, and executes programs stored in this memory or in storage unit 120, to control operations of various parts of mobile terminal 100. The memory of control unit 110 includes a buffer area for temporarily storing data for communication. Control unit 110 is an example of a communication control means of the present invention, and controls data communication between network NW1 and client terminal 200 via mobile terminal 100.

Storage unit 120 includes a hard disk and/or a rewritable memory such as an EEPROM (Electrically Erasable and Programmable Read Only Memory), and stores data and/or programs. Storage unit 120 has a larger capacity than the memory of control unit 110, and the data written in the memory of control unit 110 is moved to and stored in storage unit 120, as necessary. Storage unit 120 is an example of a storage means of the present invention.

Wireless LAN communication unit 130 conducts wireless communication with client terminal 200. Mobile communication unit 140 conducts wireless communication with network NW1. Namely, wireless LAN communication unit 130 is an example of a first communication means of the present invention, and mobile communication unit 140 is a second communication means of the present invention.

Display unit 150 includes a display means such as a liquid crystal display, and displays characters and images under control of control unit 110. Operation unit 160 includes operation elements such as buttons, and provides control unit 110 with operation information representing an operation performed by a user. Operation unit 160 may include a touch screen (touch panel) disposed integrally on display unit 150.

Client terminal 200 has a known configuration relating to input/output of information, wireless communication, and so on. Client terminal 200 of this embodiment has two modes as operation modes for communicating with mobile terminal 100: "an active mode (normal mode)" and "a power-saving mode." The active mode refers to an operation mode in which a state where client terminal 200 can receive a beacon is maintained at all times, the beacon being transmitted from mobile terminal 100 at a constant period. The power-saving mode refers to an operation mode in which a state where client terminal 200 can receive a beacon (hereinafter, "awake state") and a state where terminal 200 does not receive a beacon (hereinafter, "doze state") are switched from one to the other periodically. When client terminal 200 is in the doze state, power consumption can be suppressed as compared to a case where client terminal 200 is in the awake state. It is to be noted that in the doze state, the function relating to receipt of a beacon is restricted, but the other functions of client terminal 200 are not limited.

Client terminal 200 may be configured to enable setting of a period (listen interval) at which client terminal 200 transitions to the awake state. Typically, the listen interval is represented by a number of beacons transmitted from mobile terminal 100 from one awake state until the next awake state. For example, in a case where client terminal 200 transitions into the awake state at a rate of once in every ten beacon transmissions, the listen interval is represented as "10."

The foregoing is a description of the configuration of wireless communication system 10 in this embodiment. In such a configuration, mobile terminal 100 and client terminal 200 are placed in close proximity to each other so that communication therebetween is possible, and a user operates client terminal 200 to cause data communication to be performed. The data communication herein may be performed as a result of Web page browsing, for example, but actual content of data is not particularly limited. Further, the data communication may be started upon a request from client terminal 200, or may be started upon transmission of data from network NW1 addressed to client terminal 200.

To achieve data communication between client terminal 200 and network NW1, mobile terminal 100 conducts communication with client terminal 200 and conducts communication with network NW1. In the following description, a direction of data flow from network NW1 to client terminal 200 will be referred to as "downstream" and a direction of data flow from client terminal 200 to network NW1 will be referred to as "upstream," for convenience of explanation.

During the process of downstream data communication, first, mobile terminal 100 attempts to detect client terminal 200 by transmitting beacons periodically. After client terminal 200 is detected, mobile terminal 100 varies an interval between transmissions of beacons (beacon interval) in accordance with an operation mode of client terminal 200. It is to be noted that beacon transmission is performed by wireless LAN communication unit 130 under control of control unit 110. Namely, in this embodiment, control unit 110 and wireless LAN communication unit 130 cooperate to achieve a beacon transmission means of the present invention.

A beacon may contain a variety of information such as identification information for identifying mobile terminal 100. In this embodiment, a beacon contains a data flag, which will be described later. Client terminal 200 can detect presence of mobile terminal 100 and obtain information necessary to associate with (or connect to) mobile terminal 100 by receiving a beacon transmitted from mobile terminal 100.

Figure 3:
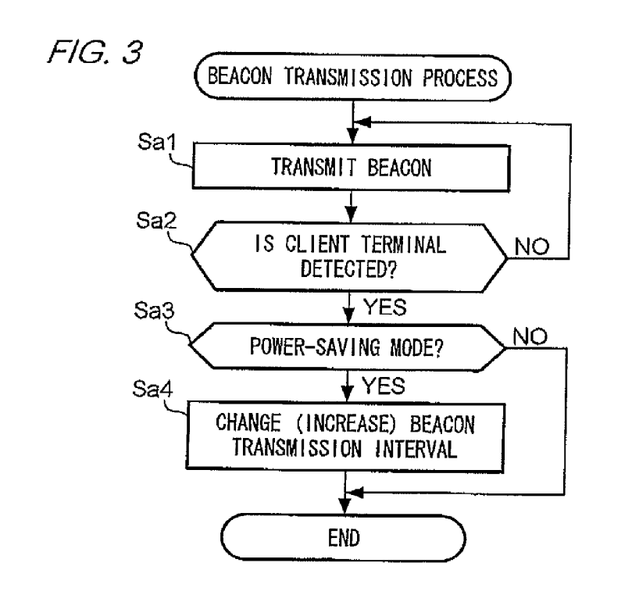
FIG. 3 is a flowchart showing a beacon-setting process.

FIG. 3 is a flowchart showing a process performed by control unit 110 to determine an interval between transmissions of beacons (hereinafter, "beacon-setting process"). As shown in this drawing, control unit 110 causes wireless LAN communication unit 130 to transmit beacons at a predetermined default transmission interval (step Sa1). The beacon transmission interval in step Sa1 will be referred to as "initial value" in the following description. It is assumed that the initial value in this embodiment is 100 ms (i.e., transmission is performed once in every 100 ms). Beacons emitted from mobile terminal 100 serving as an access point include a beacon that contains a DTIM (Delivery Traffic Indication Message) and a beacon that does not (the beacon containing a DTIM will be referred to as "DTIM beacon" hereinafter), where the DTIM indicates presence/absence of data addressed to a client terminal using mobile terminal 100 as an access point (client terminal 200 in this embodiment, but there may be multiple such client terminals in general). DTIM beacons are emitted at a regular interval. This interval will be referred to as "DTIM interval (or DTIM period)," and in an exemplary case where one DTIM beacon is emitted for every five beacons, the DTIM interval is represented as "5." Also, each beacon includes a countdown value to the next DTIM beacon (equivalent to a number of beacons emitted until the next DTIM beacon). In this way, when client terminal 200 receives a beacon, it can be determined at client terminal 200 when the next DTIM beacon will be transmitted.

Subsequently, control unit 110 determines whether client terminal 200 is detected (step Sa2). When, via an operation by a user or the like, client terminal 200 of this embodiment is requested to connect to network NW2 via mobile terminal 100 and network NW1, client terminal 200 generates an association request based on information about mobile terminal 100 contained in a received beacon, and transmits the association request to mobile terminal 100. Upon receipt of the association request from client terminal 200, control unit 110 of mobile terminal 100 performs an association process in accordance with the request, and when the association process is completed and wireless communication with client terminal 200 becomes possible, determines that client terminal 200 is detected. In this embodiment, an association request contains information representing an operation mode of client terminal 200 and information representing a listen interval of the same. It is to be noted that in this embodiment, since client terminal 200 has two operation modes, information representing an operation mode may be a flag having a value "0" or "1." Further, the information representing an operation mode and the information representing a listen interval do not have to be transmitted every time client terminal 200 responds to a beacon transmission.

Control unit 110 repeats the beacon transmission in accordance with the initial value until client terminal 200 is detected. Upon detection of client terminal 200, control unit 110 determines an operation mode of client terminal 200. Control unit 110 determines whether the operation mode of client terminal 200 is the power-saving mode (step Sa3), and in a case where the operation mode is the power-saving mode, changes the beacon transmission interval to be longer than the initial value (step Sa4), and in a case where the operation mode is the normal mode, maintains the initial value as the beacon transmission interval. Meanwhile, when in the power-saving mode, after transmission of the association request to mobile terminal 100, client terminal 200 receives the next beacon from mobile terminal 100 to obtain the countdown value, and enters the doze state. Then, client terminal 200 transitions to the awake state at a timing when the countdown is completed (that is, in synchronization with transmission of the next DTIM beacon from mobile terminal 100), and thereafter, repeats the switching between the awake state and the doze state in accordance with the listen interval. It is to be noted that typically, the listen interval is set such that client terminal 200 is in the awake state at a timing when the DTIM beacon can be received, and hence, is set at N times (N is a natural number) the DTIM interval (for example, in a case where the DTIM interval is 5 and the listen interval is 10, N is 2).

The change of the beacon transmission interval in step Sa4 is performed in accordance with the interval at which client terminal 200 transitions to the awake state, i.e., in accordance with the listen interval. For example, in a case where the listen interval is "10," namely, when client terminal 200 transitions to the awake state once in every 10 beacon transmissions based on the initial value, control unit 110 may change the beacon transmission interval to 1000 ms (1 second), that is, 10 times the initial value. More specifically, when it is determined from the association request from client terminal 200 that client terminal 200 is in the power-saving mode, mobile terminal 100 transmits at least one beacon to allow client terminal 200 to obtain the countdown value, and then, transmits a DTIM beacon to coincide with completion of the countdown (at this time, client terminal 200 in the power-saving mode also is set to be in the awake state, as described in the foregoing). Thereafter, mobile terminal 100 transmits DTIM beacons at a period (e.g., 1 sec) in accordance with the listen interval (e.g., 10) so as to synchronize with the awake state of client terminal 200 in the power-saving mode (in other words, transmits DTIM beacons at a DTIM interval that is equal to the listen interval), and does not transmit beacons between DTIM beacons (i.e., during a period in which the client terminal 200 is in the doze state). It is to be noted that in this case, control unit 110 may change the beacon transmission interval to twice or five times the initial value. Namely, instead of stopping transmission of beacons in a period in which client terminal 200 is in the doze state, control unit 10 may decrease the number of beacons transmitted. Thus, in a case where the detected client terminal 200 is in the power-saving mode, control unit 110 of mobile terminal 100 transmits beacons in synchronization with the awake state of client terminal 200, and stops transmitting beacons or decreases the number of beacons transmitted during a period in which client terminal 200 is in the doze state.

Owing to the above-described beacon-setting process, mobile terminal 100 can make the beacon transmission interval longer based on an operation mode of client terminal 200 after detection of client terminal 200. As a result, not only client terminal 200 but also mobile terminal 100 serving as an access point can be brought into a power-saving mode, thereby making it possible to reduce electric power consumption.

It is considered that in usual circumstances, operation of mobile terminal 100 will not be hindered if the beacon transmission interval is made longer. This is because, in usual cases, mobile terminal 100 does not permit connection of a terminal other than the detected client terminal 200, and therefore, it is not necessary to continue to transmit beacons at a short interval for connection of the other client terminals; though there are exceptional cases, such as a case where a user owns multiple client terminals 200 or a case where data communication using mobile terminal 100 is free of charge. Thus, in a case where client terminal 200 is connected to a network by use of mobile terminal 100 as in this embodiment, when the beacon transmission interval is made longer after detection of client terminal 200 by mobile terminal 100, reduction of performance relating to relaying is relatively small, and an effect of suppression of unnecessary use of electric power or a wireless band can be expected.

After the above-described beacon-setting process, mobile terminal 100 performs data processing for obtaining data from network NW1 and transmitting the obtained data to client terminal 200. In a case where client terminal 200 is in the doze state or in a case where client terminal 200 cannot perform wireless communication, such as when client terminal 200 is moved out of a service range, mobile terminal 100 stores the data.

Figure 4:
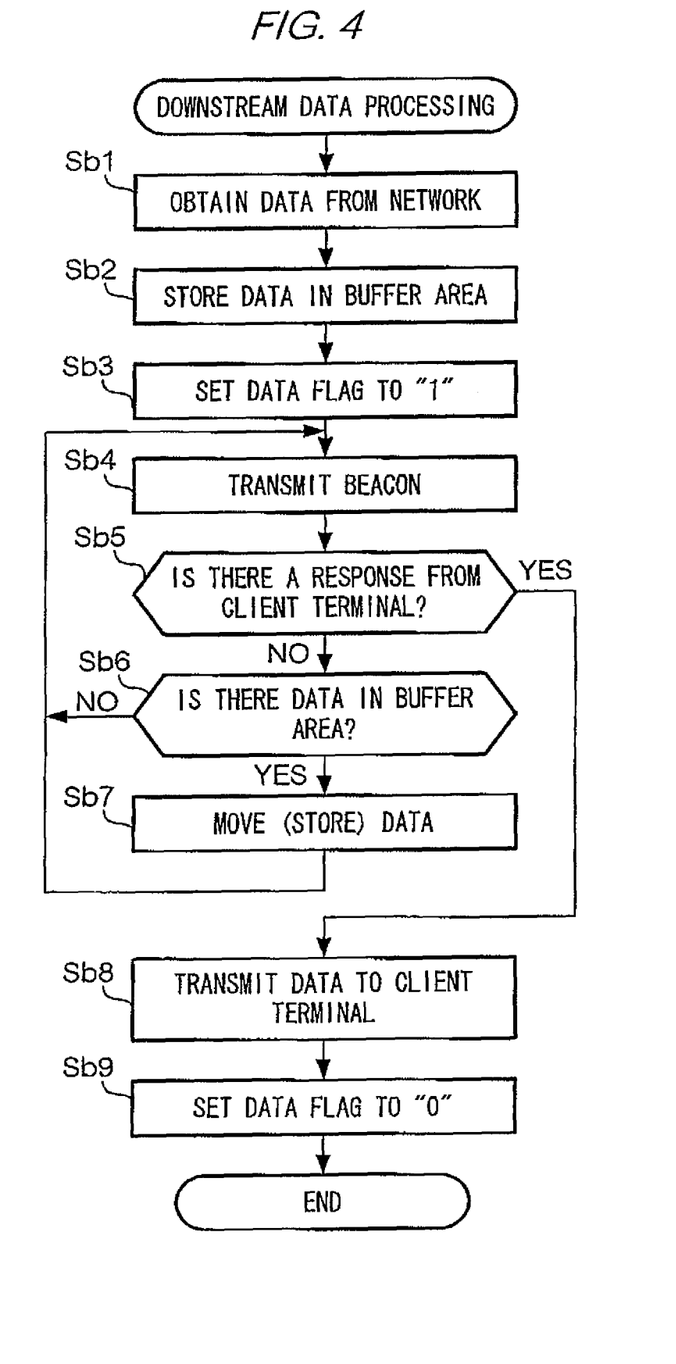
FIG. 4 is a flowchart showing downstream (from the network to the client terminal) data processing.

FIG. 4 is a flowchart showing downstream data processing performed by control unit 110. This data processing is triggered by transmission of data from network NW1. In this process, control unit 110 obtains data from network NW1 (step Sb1), and stores the data in the buffer area (step Sb2). Subsequently, if a data flag is "0," control unit 110 changes the flag to "1" (step Sb3), and transmits a beacon with the changed data flag (step Sb4). The data flag is information representing presence/absence of data addressed to client terminal 200. If the data flag is "1," it indicates that there is data addressed to client terminal 200. Upon recognition of the changed data flag, client terminal 200 requests mobile terminal 100 to transmit the data.

After the transmission of a beacon, control unit 110 determines whether there is a response (i.e., request for data) from client terminal 200 (step Sb5). When there is no response from client terminal 200, control unit 110 determines whether data to be moved to storage unit 120 is stored in the buffer area (step Sb6), and if there is such data in the buffer area, moves the data to storage unit 120 (step Sb7), to create a free space in the buffer area. Consequently, control unit 110 transmits a beacon again (step Sb4), and waits for a response from client terminal 200. Control unit 110 repeats the process of steps Sb4-Sb7 until there is a response from client terminal 200.

It is to be noted that when control unit 110 repeats the process of steps Sb4-Sb7, control unit 110 may omit the process of step Sb7 when there is no data to be moved to storage unit 120. For example, in a case where after obtaining of data is completed, control unit 110 fails to receive a response from client terminal 200 in succession, control unit 110 repeatedly performs transmission of a beacon (step Sb4) and attempts detection of a response from client terminal 200 (step Sb5).

When there is a response from client terminal 200, control unit 110 controls wireless LAN communication unit 130 to transmit data to client terminal 200 (step Sb8). At this time, if data is stored in storage unit 120, control unit 110 causes the stored data to be transmitted, and if data is not stored in storage unit 120, control unit 110 causes the data stored in the buffer area to be transmitted. When the data transmission is completed and there is no data to be transmitted, control unit 110 changes the data flag from "1" to "0" (step Sb9).

As described in the foregoing, mobile terminal 100 has a function of storing data. With such a function, mobile terminal 100 can transmit data to client terminal 200 even when client terminal 200 is in the doze state for an extended period of time or when a state in which client terminal 200 cannot perform wireless communication continues for another reason. Further, since a storage medium other than the buffer area is provided as a data storage means, it is possible to minimize the capacity of the buffer area.

Further, mobile terminal 100 performs data storage during upstream data communication in a similar manner.

Figure 5:
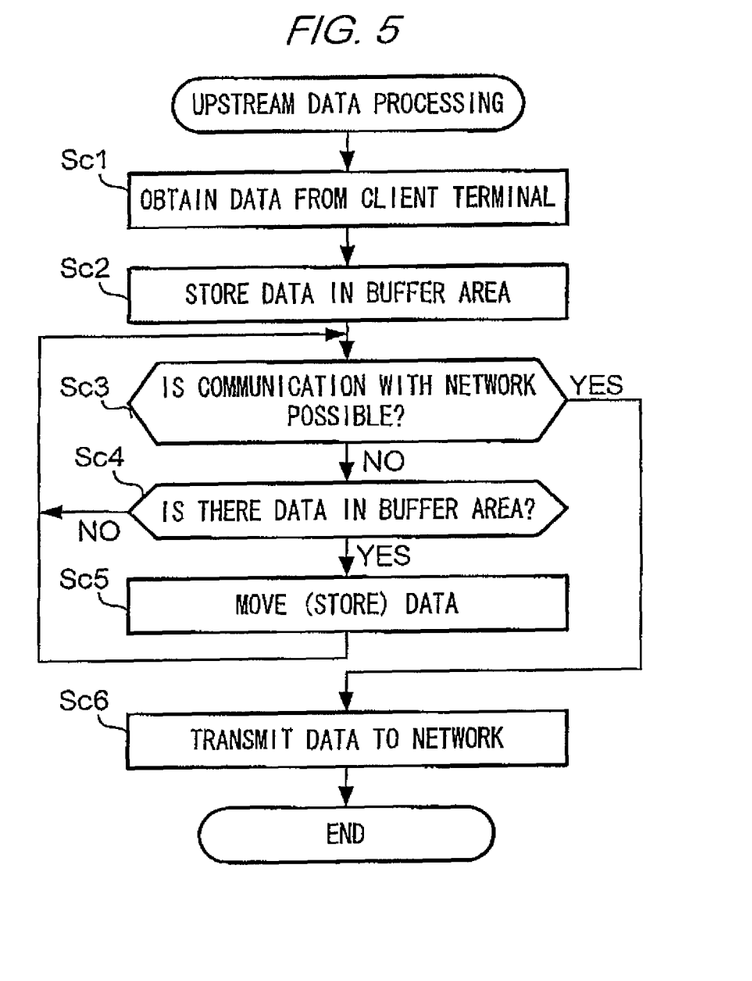
FIG. 5 is a flowchart showing upstream (from the client terminal to the network) data processing.

FIG. 5 is a flowchart showing upstream data processing performed by control unit 110. This data processing is triggered by transmission of data from client terminal 200. Until reception of data from client terminal 200, mobile terminal 100 is in a state of waiting to receive data from client terminal 200. In such a state, when control unit 110 obtains data from client terminal 200 (step Sc1), control unit 110 stores the data in the buffer area (step Sc2).

Subsequently, control unit 110 determines whether communication with network NW1 via mobile communication unit 140 is possible (step Sc3). When mobile terminal 100 is outside a service area of network NW1 and wireless communication with network NW1 is not possible, control unit 110 determines whether data to be moved to storage unit 120 is stored in the buffer area (step Sc4), and if such data is stored in the buffer area, moves the data to storage unit 120 (step Sc5), to create a free space in the buffer area. Thereafter, control unit 110 repeats the process of steps Sc3-Sc5 to accumulate data in storage unit 120 until wireless communication with network NW1 becomes possible.

When mobile terminal 100 is in the service area of network NW1 and wireless communication with network NW1 is possible, control unit 110 controls mobile communication unit 140 to transmit the data to network NW1 (step Sc6). At this time, if data is stored in storage unit 120, control unit 110 causes the stored data to be transmitted, and if data is not stored in storage unit 120, control unit 110 causes data stored in the buffer area to be transmitted.

[Modifications]

The present invention is not limited to the above-described exemplary embodiment, and may be carried out in other embodiments. For example, the present invention may be carried out in each of the following modifications. It is to be noted that the present invention may be practiced in any combination of these modifications.

The present invention is most effective in suppressing use of electric power or a wireless band in a case where a single client terminal is connected with the mobile terminal, but does not prevent use of multiple client terminals. In a case where the mobile terminal of the present invention performs wireless communication with multiple client terminals, the mobile terminal may carry out the aforementioned beacon-setting process for each client terminal, and transmit beacons at timings and transmission intervals suitable for respective client terminals. In this case, the multiple client terminals may include a client terminal(s) in the active mode and a client terminal(s) in the power-saving mode, and the beacon transmission interval in the power-saving mode may not be the same between different client terminals.

In a case where multiple client terminals are connected with a mobile terminal, the mobile terminal manages the aforementioned data flag for each of the client terminals. Namely, the mobile terminal determines presence/absence of data to be transmitted for each client terminal, and changes the data flag in accordance with a result of the determination. At this time, it is preferred that the mobile terminal stores a table for managing respective data flags. Also, the mobile terminal determines for each client whether there is a response from the client, and depending on the result of the determination, transmits or stores the data.

Figure 6:
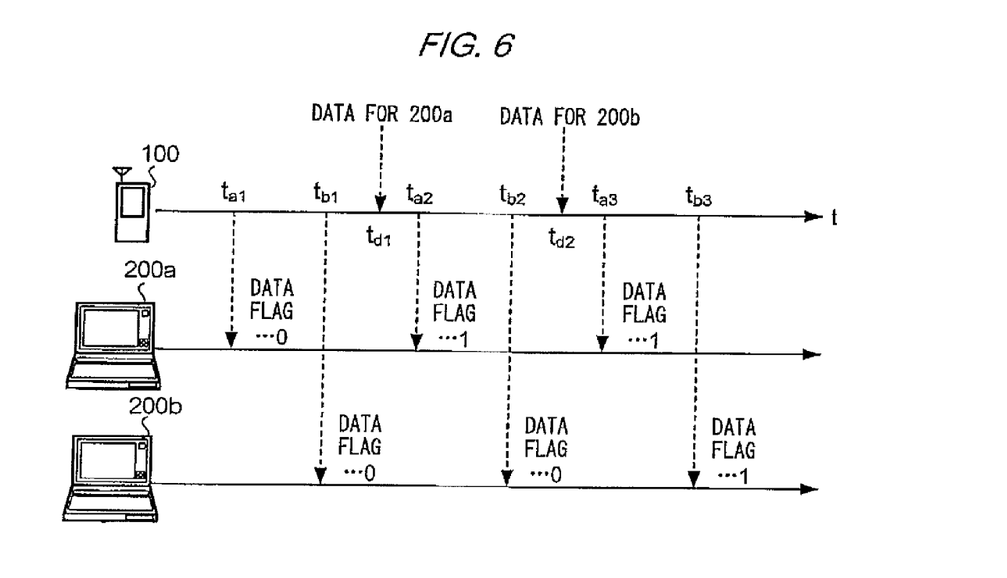
FIG. 6 is a diagram showing a mode of beacon transmission according to a modified embodiment of the present invention.

FIG. 6 is a schematic diagram showing a mode of beacon transmission according to this modification, in which it is assumed that first client terminal 200a and second client terminal 200b are connected with mobile terminal 100. It is also assumed here that each of client terminals 200a and 200b has the same configuration as that of the aforementioned client terminal 200, and is operating in the power-saving mode.

In accordance with a predetermined transmission interval, mobile terminal 100 transmits beacons to client terminal 200a at times ta1, ta2, and ta3, and transmits beacons to client terminal 200b at times tb1, tb2, and tb3. In a case where there is no data to be transmitted to client terminal 200a or 200b, mobile terminal 100 transmits a beacon with a data flag being "0," and when data to be transmitted is obtained, mobile terminal 100 transmits a beacon with a data flag being "1." For example, as shown in FIG. 6, in a case where data for client terminal 200a is obtained at time td1, mobile terminal 100 changes the data flag for the beacon transmitted to client terminal 200a at time ta2 and subsequent beacons to "1." Further, in a case where data for client terminal 200b is obtained at time td2, mobile terminal 100 changes the data flag for the beacon transmitted to client terminal 200b at time tb3 and subsequent beacons to "1." Thereafter, when the data transmission to client terminal 200a or 200b is completed, mobile terminal 100 transmits to the client terminal beacons with the data flag being changed to "0."

It is to be noted that, in the mobile terminal of the present invention, when a number of client terminals that can be connected with the mobile terminal is limited to one, use of the data flag may be omitted and the determination on whether to transmit or store data may be made based on whether communication with a client terminal to which the data is addressed is possible.

The mobile terminal of the present invention may operate in a stealth mode after detection of a client terminal. The stealth mode is a mode in which the mobile terminal transmits beacons not containing identification information of the mobile terminal. In this way, unintended connection with another client terminal can be prevented.

The mobile terminal of the present invention, after making the beacon transmission interval longer, may shorten the transmission interval again. For example, in the foregoing embodiment, mobile terminal 100 may set the beacon transmission interval to be shorter than it is in a state in which mobile terminal 100 is waiting for data (for example, set the transmission interval back to the initial value), while mobile terminal 100 conducts data communication with client terminal 200 (namely, during communication). In this case, mobile terminal 100 may set the beacon transmission interval to be longer again when the data communication with client terminal 200 is over, and mobile terminal 100 is brought into a state of waiting for data from client terminal 200 in the power-saving mode.

Instead of being embodied as the aforementioned mobile terminal 100, the present invention may be embodied as control unit 110 or a program executed by control unit 110. Further, such a program may be downloaded to a mobile terminal via a network such as the Internet, and installed so as to be usable. Furthermore, the present invention may be embodied as a storage medium such as an optical disk on which the program is stored.

What is claimed is:

1. A mobile terminal comprising:
a first communication unit that conducts wireless communication with a client terminal;
a second communication unit that conducts wireless communication with a network;
a storage unit that stores data; and
a control unit that causes data received via one of the first communication unit and the second communication unit to be transmitted by the other,
wherein
the control unit causes the data received via the second communication unit to be stored in the storage unit when the client terminal is in a state in which the client terminal does not receive data, and causes the stored data to be transmitted by the first communication unit when the client terminal is in a state in which the client terminal receives data,
the control unit causes the data received via the first communication unit to be stored in the storage unit when wireless communication with the network is not possible, and causes the stored data to be transmitted by the second communication unit when wireless communication with the network is possible,
the control unit transmits beacons at a transmission interval determined based on information received from the client terminal, and
the control unit, upon receipt of an association request from the client terminal, causes wireless communication with the client terminal to become possible by performing an association process and, upon the receipt of the association request, sets the transmission interval of the beacons to be longer than prior to the association, the association request being a request to connect to the mobile terminal.

2. The mobile terminal according to claim 1, wherein the control unit sets the transmission interval of the beacon to be shorter during data communication between the mobile terminal and the client terminal than during a state when the mobile terminal is waiting for data to be received from the client terminal.

3. A data relay method for relaying, at a mobile terminal, data transmitted between a client terminal and a network, comprising:
storing data received by the mobile terminal via the network in a storage unit of the mobile terminal when the client terminal is in a state in which the client terminal does not receive data;
transmitting the data stored in the first step from the mobile terminal to the client terminal when the client terminal is in a state in which the client terminal receives data;
storing data received by the mobile terminal from the client terminal in the storage unit when wireless communication between the network and the mobile terminal is not possible; and
transmitting the data stored in the third step from the mobile terminal to the network when wireless communication between the network and the mobile terminal is possible; and
transmitting beacons at a transmission interval determined based on information received from the client terminal, and, upon receipt of an association request from the client terminal, causing wireless communication with the client terminal to become possible by performing an association process and, upon the receipt of the association request, setting the transmission interval of the beacons to be-longer than prior to the association, the association request being a request to connect to the mobile terminal.

* * * * *